United States Patent [19]

Watanabe et al.

[11] 4,429,470
[45] Feb. 7, 1984

[54] INCLINOMETER

[75] Inventors: Noboru Watanabe, Tokyo; Hiroshi Iiyama, Yokosuka, both of Japan

[73] Assignee: Jeco Co., Ltd., Kawasaki, Japan

[21] Appl. No.: 336,628

[22] Filed: Jan. 4, 1982

[30] Foreign Application Priority Data

Jan. 13, 1981 [JP] Japan .................... 56/3427[U]

[51] Int. Cl.³ ................................ G01C 9/16
[52] U.S. Cl. ............................................ 33/395
[58] Field of Search ........................ 33/395–401, 33/391

[56] References Cited

U.S. PATENT DOCUMENTS

| | | | |
|---|---|---|---|
| 564,449 | 7/1896 | Nickerson et al. | 33/395 X |
| 1,383,946 | 7/1921 | Herring | 33/395 |
| 2,651,848 | 9/1953 | Sims | 33/395 X |
| 3,378,932 | 4/1968 | Neill | 33/401 X |
| 3,975,831 | 8/1976 | Jysky et al. | 33/395 X |

FOREIGN PATENT DOCUMENTS

| | | | |
|---|---|---|---|
| 260623 | 5/1913 | Fed. Rep. of Germany | 33/395 |
| 45-7207 | 3/1970 | Japan . | |
| 51-35160 | 3/1976 | Japan . | |
| 118505 | 9/1918 | United Kingdom | 33/395 |

*Primary Examiner*—Harry N. Haroian
*Attorney, Agent, or Firm*—Charles E. Pfund

[57] ABSTRACT

In an inclinometer of the type wherein inclinations in the fore and aft and left and right directions of a motor car are displayed independently, there are provided a pair of intermeshing sector gears, weights mounted on one of the sector gears, display discs mounted on shafts of one sector gears, and a scale cooperating with respective display discs for displaying pitching and rolling angles of the motor car.

5 Claims, 4 Drawing Figures

INCLINOMETER

BACKGROUND OF THE INVENTION

This invention relates to an inclinometer, especially suitable for mounting on a motor car.

Various types of inclinometers for mounting on motor cars have been developed, but until today no satisfactory inclinometer has been developed that enables a motor can driver to directly read the angles of rolling and pitching of his car in terms of the actual inclination angle.

For example, one of the prior art inclinometer is constructed to detect either the rolling angle or the pitching angle of a motor car so that when the inclinometer can detect only the rolling angle, as the motor car runs up a gentle slope the driver can not detect or perceive the pitching angle, with the result that even when an acceleration adjustment has been made to some extent at that time, the speed of the car would increase or decrease. On the other hand, when the inclinometer can detect only the pitching angle, as the car runs along a gentle curve, the driver can not detect or perceive the rolling angle so that the timing of correcting the driving control would lag too much.

To eliminate these problems, there has also been proposed an inclinometer capable of detecting both of the pitching and rolling angles as disclosed, for example in Japanese utility model laid open patent specification No. 35,160 or 1976. With this inclinometer, however, as the pitching and rolling angles are displayed on different scales, the driver is required to have considerably high skill in order to instantly read both displays. Especially, according to the prior art inclinometer, as the rolling and pitching angles are displayed independently, either one of the displays is different from the actual resultant inclination angle of the car. For this reason, the driver is required to have a high degree of skill for reading the displays. Further, as above described, since the prior art inclinometer was constructed to independently display the pitching and rolling angles, the small display meters are difficult to read, thus imposing a limit for miniaturization.

SUMMARY OF THE INVENTION

Accordingly, it is a principal object of this invention to provide an improved inclinometer having a simple display surface and permitting read reading of both of the pitching and rolling angles of a motor car.

Another object of this invention is to provide a novel inclinometer capable of reading the pitching and rolling angles with feelings commensulate with the actual inclination of a motor car.

A further object of this invention is to provide an improved inclinometer having a compact construction, but yet capable of accurately reading the pitching and rolling angles of a motor car.

According to this invention, these and other objects can be accomplished by providing a common scale between first and second display members adapted to respectively display the rolling and pitching angles, the common scale being disposed between the first and second display members.

Briefly stated, according to this invention, there is provided an inclinometer of the type wherein inclinations in the fore and aft and left and right directions of a vehicle are displayed independently, characterized by comprising weights for detecting inclinations of the vehicle in respective directions, means for displaying inclinations of the vehicle in respective directions, and means for transmitting rotations of the weights to the display means so as to display inclinations of the vehicle.

DESCRIPTION OF THE PREFERRED EMBODIMENTS

Figure 1:
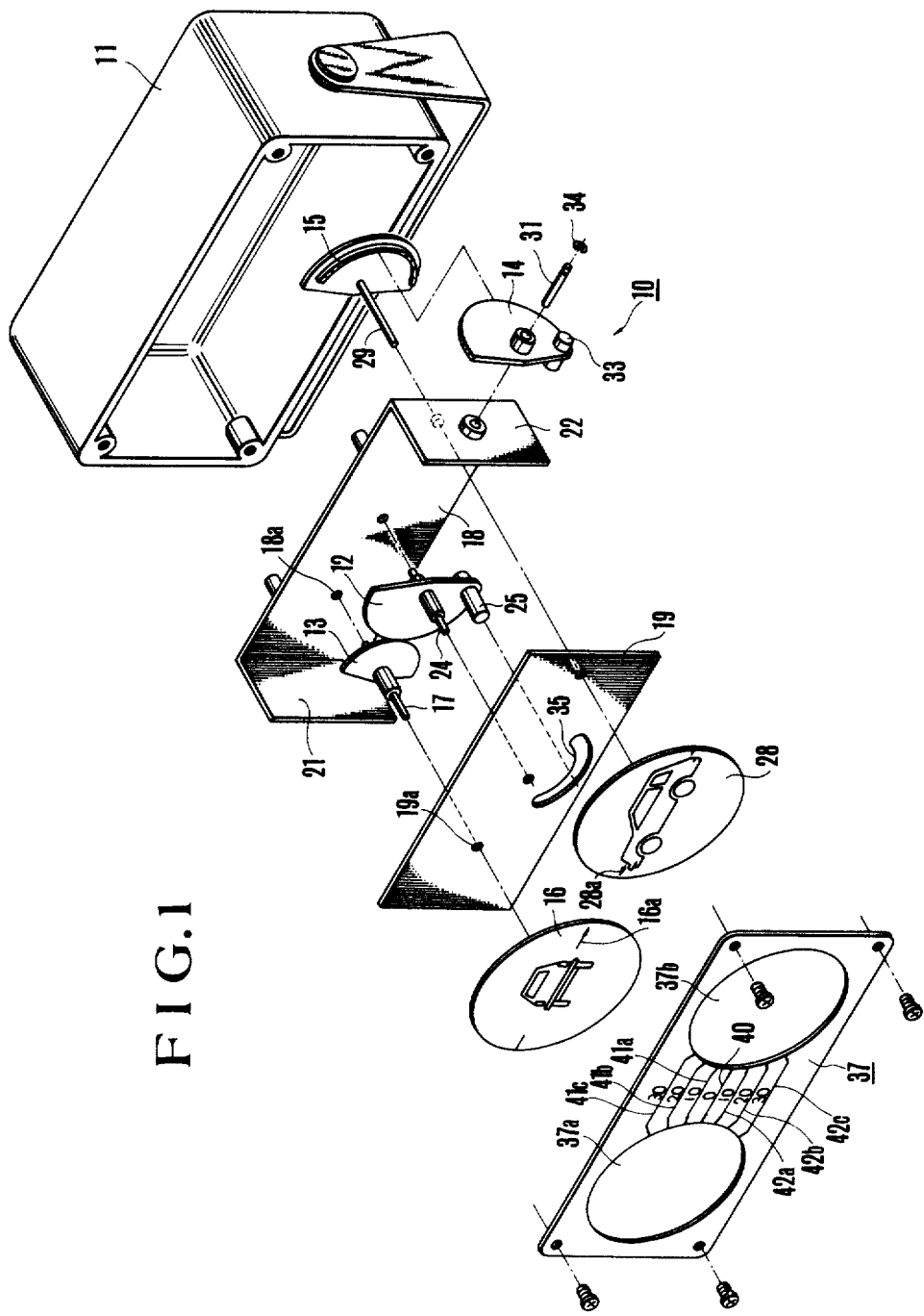
FIG. 1 is an exploded perspective view showing an inclinometer embodying the invention.
Figure 2:
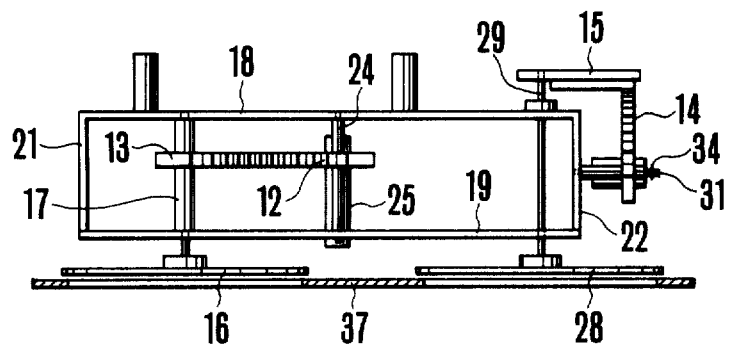
FIG. 2 is a plan view of the assembled state of the inclinometer shown in FIG. 1.
Figure 3:
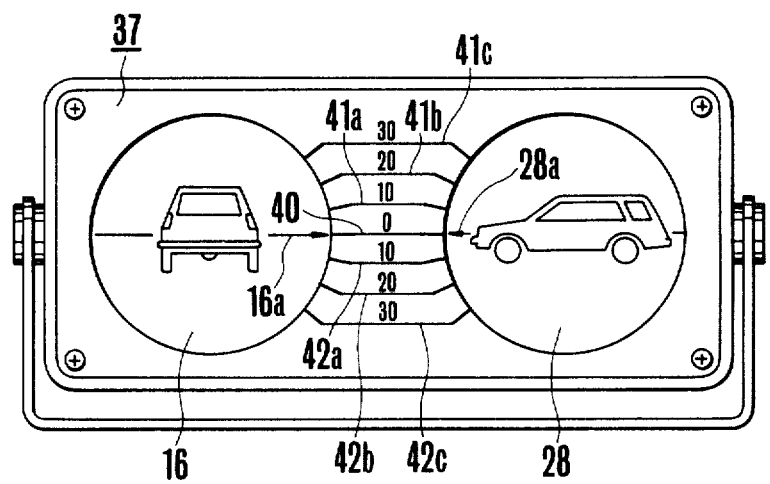
FIG. 3 shows a front view of the inclinometer shown in FIG. 1.

A preferred embodiment of the inclinometer 10 shown in FIGS. 1, 2 and 3 and utilizing a gear transmission system of the gravity type comprises a casing 11 containing a pair of sector gears 12 and 13 for driving in the left and right directions (rolling direction) corresponding to the left and right directions, and another pair of sector gears 14 and 15 for driving in the fore and aft directions, that is in the directions of pitching.

Each of these sector gears 12-15 takes the form of a semicircle, that is with its teeth not necessary for transmission are removed. This construction enables miniaturization of the inclinometer 10. A left and right inclination display disc 16 is mounted on one end of the drive shaft 17 of the sector gear 13, and the other end of the shaft 17 is received in an opening 18a of a vertical frame or supporting plate 18. The one end of the drive shaft 17 projects through a perforation 19a of another supporting plate 19 to support the rolling inclination display disc 16. The vertical supporting plates 18 and 19 are interconnected through connecting plates 21 and 22. The shaft 24 of the sector gear 12 meshing with the sector gear 13 also extends between support plates 18 and 19. A weight 25 is secured to the sector gear 12 such that the weight 25 assumes a position just beneath the shaft 24 when the display disc 16 displays a zero rolling angle.

The shaft 29 of the sector gear 15 for driving in the fore and aft directions (the direction of pitching) extends through the supporting plates 18 and 19 to support a fore and aft inclination display disc 28 at one end thereof. The sector gear 14 is rotatably mounted on a shaft 31 secured to the connecting plate 22 in a direction perpendicular to the shaft 29 of the sector gear 15. A weight 33 is secured to the sector gear 14 such that when the display disc 28 displays a zero pitching inclination, the weight 33 would assume a position just beneath the shaft 31. 34 designates an E ring, and 35 an arcuate slot provided for the supporting plate 19 through which the weight 25 secured to the sector gear 12 rotates. A scale board 37 is provided on the front side of the inclinometer 10 and provided with spaced circular openings 37a and 37b for receiving the display discs 16 and 28 respectively. In a region between the openings 37a and 37b is provided a horizontal scale line 40 (at a zero angle with respect to the vertical) which interconnects the display positions of the display arrows 16a and 28a of respective discs 16 and 28 at a time when the car is horizontal. Equally spaced scale lines 41a, 41b ... 42a, 42b . . . , are provided on the upper side and lower side of the scale line 40 acting as a reference line. Since the display arrows 16a and 28a of respective display discs 16 and 28 move circumferentially, the opposite ends of respective scale lines are bent in the radial directions of the respective circular openings so as to display equally spaced angles.

With this construction, when the motor car turns to the left or right or runs along a bank, the car inclines to the left or right. As a consequence, the sector gears 12 and 13 are rotated so that the display arrow 16a of the disc 16 is rotated by an angle corresponding to the inclination of the car, thus enabling the driver to read a scale displaying the inclination angle at that time. Since two sector gears are used, the display arrow 16a inclines in the same direction as the actual direction or inclination of the car. For example, when the car runs on a right bank, the display arrow 16a rotates in the clockwise direction, thus displaying the inclination angles with scale lines 42a, 42b . . . below the reference scale line 40. On the other hand, when the car runs on a left bank the inclination angle is displayed by using scale lines 41a, 41b . . . above the reference scale line 40. When the car runs along a slope, the car inclines in the fore and aft (longitudinal) direction to rotate sector gears 14 and 15 so that the display arrow 28a of the disc 28 would rotate in a direction corresponding to the actual inclination of the car, thereby enabling the driver to read a scale showing the inclination. In this case too, since two sector gears are used, the direction of rotation of the display arrow 28a is the same as the actual direction of inclination of the car. For example, when the car runs on a down slope scale lines 42a, 42b . . . beneath the reference scale line 40 are used, whereas in the case of an up slope scale lines 41a, 41b . . . above the reference scale line 40 are used. As the car runs on a banked slope, both display arrows 16a and 28a rotate thus displaying the actual attitude of the car.

In this embodiment, since the display discs 16 and 28 are provided with diagrammatic patterns as viewed from the rear side and the lateral side of the car, it can be noted, at a glance, which of the inclination angles the display arrows 16a and 28a are displaying. Further, in the illustrated embodiment, since the scale board 37 is constructed such that the rolling and pitching are displayed by the same scale not only construction is extremely simplified but also the displayed scale can be read easily and accurately. Moreover, the scale board 37 has an excellent design appearance. Moreover, the gears employed are sector gears so that it is possible to reduce the weight and space, thus enabling to construct the inclinometer as a compact and small unit.

The weight 25 is intentionally disposed at a point intermediate of the two inclination display members to make full use of the space therebetween, instead of being disposed laterally and outwardly of the display members, thus contributing to reduction of the size of the inclinometer.

Figure 4:
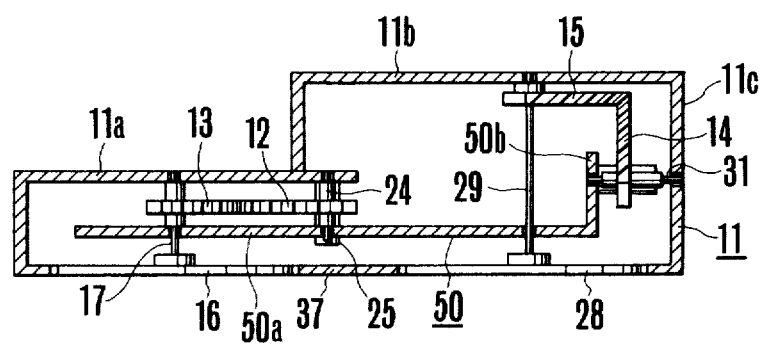
FIG. 4 is a sectional view showing another embodiment of this invention.

FIG. 4 shows another embodiment of this invention, in which elements similar to those shown in FIGS. 1-3 are designated by the same reference numerals. In this modification, gears 12 and 13 adapted to display the rolling inclination and gears 14 and 15 adapted to display the pitching inclination are supported by the casing 11 and a supporting plate 50 disposed between the casing 11 and the scale board 37 and secured to the casing 11. More particularly, the gears 13 and 12 are supported by parallel shafts 17 and 24 respectively supported by a portion 11a of the casing 11 and a portion 50a of the supporting plate 50 in parallel with the scale board 37. A gear 15 mounted on a rotary shaft 29 is disposed between the portion 50a of the supporting plate 50 and a portion 11b of the casing 11 also parallel with the scale board 37, and a gear 14 mounted on a rotary shaft 31 is disposed between a portion 50b of the supporting plate 50 perpendicular to the scale board 37 and a portion 11c of the casing 11 perpendicular to the scale board 37. In this case, gears 14 and 15 comprise bevel gears. This modification can be constructed more compact than the first embodiment.

It will be clear that the invention is not limited to the specific embodiments described above and that many changes and modifications will be obvious to one skilled in the art.

Furthermore, it should be understood that the inclinometer of this invention can also be used for any vehicle other than a motor car which undergoes rolling and pitching inclinations, for example an aircraft.

What is claimed is:

1. An inclinometer of the type wherein inclinations in the fore and aft and left and right directions of a vehicle are displayed independently, characterized by comprising:

first and second parallel shafts supported by a frame with a predetermined spacing;

a scale board mounted on a front surface of said frame;

a first display member mounted on a front end of said first shaft for displaying a rolling angle of said vehicle on which said inclinometer is mounted;

a second display member mounted on a front end of said second shaft for displaying a pitching angle of said vehicle;

a first detecting means, coupled with said first shaft, including a rolling weight of detecting a rolling angle of said vehicle relative to the gravitational direction, said rolling weight being rotatable on an axis parallel to the axis on which said first shaft rotates;

a second detecting means, coupled with said second shaft, including a pitching weight for detecting a pitching angle of said vehicle relative to the gravitational direction, said pitching weight being rotatable on an axis perpendicular to the axis on which said second shaft rotates; and a common scale provided on said scale board and positioned between said first and second display members for displaying said rolling angle and said pitching angle as said display members rotate adjacent the common indices of said scale in response to their respective detecting means.

2. The inclinometer according to claim 1 wherein said weights are secured to gears adapted to transmit rotational motions of said weights caused by inclinations of said vehicle to said display members.

3. The inclinometer according to claim 2 wherein said gears comprise two pairs of sector gears, each of said weights being secured respectively to one sector gear in each pair such that the weights would occupy positions just beneath shafts of said one sector gear respectively when said vehicle does not incline and each of said parallel shafts being secured to the other sector gear in each pair.

4. The inclinometer according to claim 3 wherein the shaft of one of said sector gears in one said pair is perpendicular to the shaft of one said sector gear of the other pair or sector gears and each of said display members comprises a circular disc.

5. The inclinometer according to claim 4 wherein said scale board is provided with a plurality of horizontal display lines indexed by said circular discs.

* * * * *